(12) United States Patent
Saito et al.

(10) Patent No.: US 10,889,174 B2
(45) Date of Patent: Jan. 12, 2021

(54) CONTROL APPARATUS AND CONTROL METHOD FOR HYBRID VEHICLE

(71) Applicant: DENSO CORPORATION, Kariya (JP)

(72) Inventors: Kohei Saito, Kariya (JP); Shigeru Maeda, Kariya (JP)

(73) Assignee: DENSO CORPORATION, Kariya (JP)

( * ) Notice: Subject to any disclaimer, the term of this patent is extended or adjusted under 35 U.S.C. 154(b) by 166 days.

(21) Appl. No.: 15/766,731

(22) PCT Filed: Oct. 14, 2016

(86) PCT No.: PCT/JP2016/080519
§ 371 (c)(1),
(2) Date: Apr. 6, 2018

(87) PCT Pub. No.: WO2017/065265
PCT Pub. Date: Apr. 20, 2017

(65) Prior Publication Data
US 2018/0297462 A1 Oct. 18, 2018

(30) Foreign Application Priority Data
Oct. 16, 2015 (JP) ................................. 2015-204817

(51) Int. Cl.
*B60K 6/26* (2007.10)
*B60W 10/08* (2006.01)
(Continued)

(52) U.S. Cl.
CPC .............. *B60K 6/26* (2013.01); *B60K 6/48* (2013.01); *B60K 6/485* (2013.01); *B60K 6/543* (2013.01);
(Continued)

(58) Field of Classification Search
CPC . B60K 6/26; B60K 6/48; B60K 6/485; B60K 6/543; B60K 6/547; B60L 50/61;
(Continued)

(56) References Cited

U.S. PATENT DOCUMENTS

| 2002/0050259 A1* | 5/2002 | Kojima | B60K 6/48 123/179.3 |
|---|---|---|---|
| 2016/0257189 A1* | 9/2016 | Hata | B60K 6/445 |
| 2017/0043757 A1* | 2/2017 | Sujan | B60W 10/08 |

FOREIGN PATENT DOCUMENTS

| JP | 2005-218251 A | 8/2005 |
|---|---|---|
| JP | 2013-001158 A | 1/2013 |

(Continued)

OTHER PUBLICATIONS

Jan. 10, 2017 International Search Report issued in International Patent Application No. PCT/JP2016/080519.

*Primary Examiner* — Fadey S. Jabr
*Assistant Examiner* — Naeem Taslim Alam
(74) *Attorney, Agent, or Firm* — Oliff PLC

(57) ABSTRACT

A control apparatus sets an upper limit guard value to a base value when the MG provides torque assist to thereby limit the command value for the MG. Then, the control apparatus limits the command value for the MG using the upper limit guard value to limit the output of the MG. If an accelerator opening or the change rate thereof is not less than a predetermined value, the control apparatus corrects the upper limit guard value. The correction is made such that the larger accelerator opening or a larger change rate thereof causes the upper limit guard value to be larger to accomplish higher output. Similarly, if the SOC of the battery is not less than a predetermined value, the control apparatus corrects the upper limit guard value. If the engine speed is not less than a predetermined value, the control apparatus corrects the upper limit guard value.

8 Claims, 6 Drawing Sheets

(51) Int. Cl.
  *B60K 6/485*   (2007.10)
  *B60L 15/20*   (2006.01)
  *B60W 20/10*   (2016.01)
  *B60L 58/13*   (2019.01)
  *B60L 50/61*   (2019.01)
  *B60K 6/48*    (2007.10)
  *B60K 6/543*   (2007.10)
  *B60K 6/547*   (2007.10)
  *B60L 50/16*   (2019.01)

(52) U.S. Cl.
  CPC .............. *B60K 6/547* (2013.01); *B60L 15/20* (2013.01); *B60L 15/2045* (2013.01); *B60L 15/2054* (2013.01); *B60L 50/16* (2019.02); *B60L 50/61* (2019.02); *B60L 58/13* (2019.02); *B60W 10/08* (2013.01); *B60W 20/10* (2013.01); *B60L 2240/12* (2013.01); *B60L 2240/14* (2013.01); *B60L 2240/423* (2013.01); *B60L 2240/425* (2013.01); *B60L 2240/441* (2013.01); *B60L 2240/443* (2013.01); *B60L 2240/445* (2013.01); *B60L 2240/486* (2013.01); *B60L 2250/26* (2013.01); *B60W 2540/10* (2013.01); *B60W 2540/106* (2013.01); *B60W 2710/086* (2013.01); *Y02T 10/62* (2013.01); *Y02T 10/7072* (2013.01); *Y02T 10/72* (2013.01)

(58) Field of Classification Search
  CPC .......... B60L 50/16; B60L 58/13; B60L 15/20; B60L 15/2045; B60L 15/2054; B60L 2240/12; B60L 2240/14; B60L 2240/423; B60L 2240/425; B60L 2240/441; B60L 2240/443; B60L 2240/445; B60L 2240/486; B60L 2250/26; B60W 10/08; B60W 20/10; B60W 2540/106; B60W 2710/086; Y02T 10/6221; Y02T 10/7077
  USPC ......................................................... 701/22
  See application file for complete search history.

(56) References Cited

FOREIGN PATENT DOCUMENTS

| | | |
|---|---|---|
| JP | 2013-189134 A | 9/2013 |
| JP | 2013-189135 A | 9/2013 |

* cited by examiner

CONTROL APPARATUS AND CONTROL METHOD FOR HYBRID VEHICLE

CROSS-REFERENCE TO RELATED APPLICATION

This application is based on and claims the benefit of priority from earlier Japanese Patent Application No. 2015-204817 filed on Oct. 16, 2015, the disclosure of which is incorporated herein by reference.

TECHNICAL FIELD

The present disclosure relates to control techniques of hybrid vehicles having an engine and a motor generator serving as power sources.

BACKGROUND ART

Hybrid vehicles mounting an engine and a motor generator serving as power sources have drawn attention recently since the society is in need of vehicles with low fuel consumption and low emission. PTL1 discloses a hybrid vehicle having both an engine and a motor generator which generate power used for running. The vehicle runs with the power of the engine and when acceleration is requested during running, the motor generator provides torque assist for the engine.

CITATION LIST

Patent Literature

PTL 1: JP 2013-189134 A

SUMMARY OF THE INVENTION

Technical Problem

PTL1 does not refer to a method of determining an output of a motor generator when torque assist is provided. Accordingly, in the hybrid vehicle described in PTL1, torque assist may be performed until the output of the motor generator reaches a range where the output is comparatively large. However, in general, the larger the electric power consumption of the motor generator is, the larger the electric power losses tend to be in the individual components. The electric power losses include, for example, a loss due to internal resistance of the battery, a loss caused in the wiring between the battery and the motor generator, and a loss caused inside the motor generator. Thus, in the hybrid vehicle performing torque assist in a high output range, the total loss of the electric power is increased, and thus the efficiency of the motor generator (ratio of the shaft power to the electric power consumption) is decreased. This unfortunately causes a problem of not achieving the effect of high fuel efficiency.

An object of the present disclosure is to offer a control apparatus and a control method for a hybrid vehicle, in which the effect of the fuel efficiency is increased in a system that performs torque assist with a motor generator while the vehicle runs with the power of engine.

Solution to Problem

An aspect of techniques of the present disclosure is a control apparatus of a hybrid vehicle having an engine (11) and a motor generator (12) as power sources of the vehicle, and performing torque assist using the motor generator during running with power of the engine. The apparatus includes: a setting unit (29) which sets an upper limit guard value for limiting a command value of the motor generator to a base value such that a ratio of a shaft power to an electric power consumption is not less than a predetermined value, when providing the torque assist; and a limiting unit (29) which limits an output of the motor generator by limiting a command value of the motor generator, using the upper limit guard value, when providing the torque assist.

The control apparatus as described above sets the upper limit guard value of an output command for the motor generator to the base value when the motor generator provides torque assist. The base value is set such that the efficiency of the motor generator (ratio of the shaft power to the electric power consumption) is not less than the predetermined value. The control apparatus limits the output command for the motor generator using the set upper limit guard value, to limit the output of the motor generator. This enables the control apparatus as described above to provide torque assist in a high efficiency range where the efficiency of the motor generator is not less than the predetermined value. Thus, the effect of the fuel efficiency is increased.

DESCRIPTION OF THE EMBODIMENTS

With reference to the accompanying drawings, an embodiment for implementing the technique of the present disclosure will be described.

Figure 1:
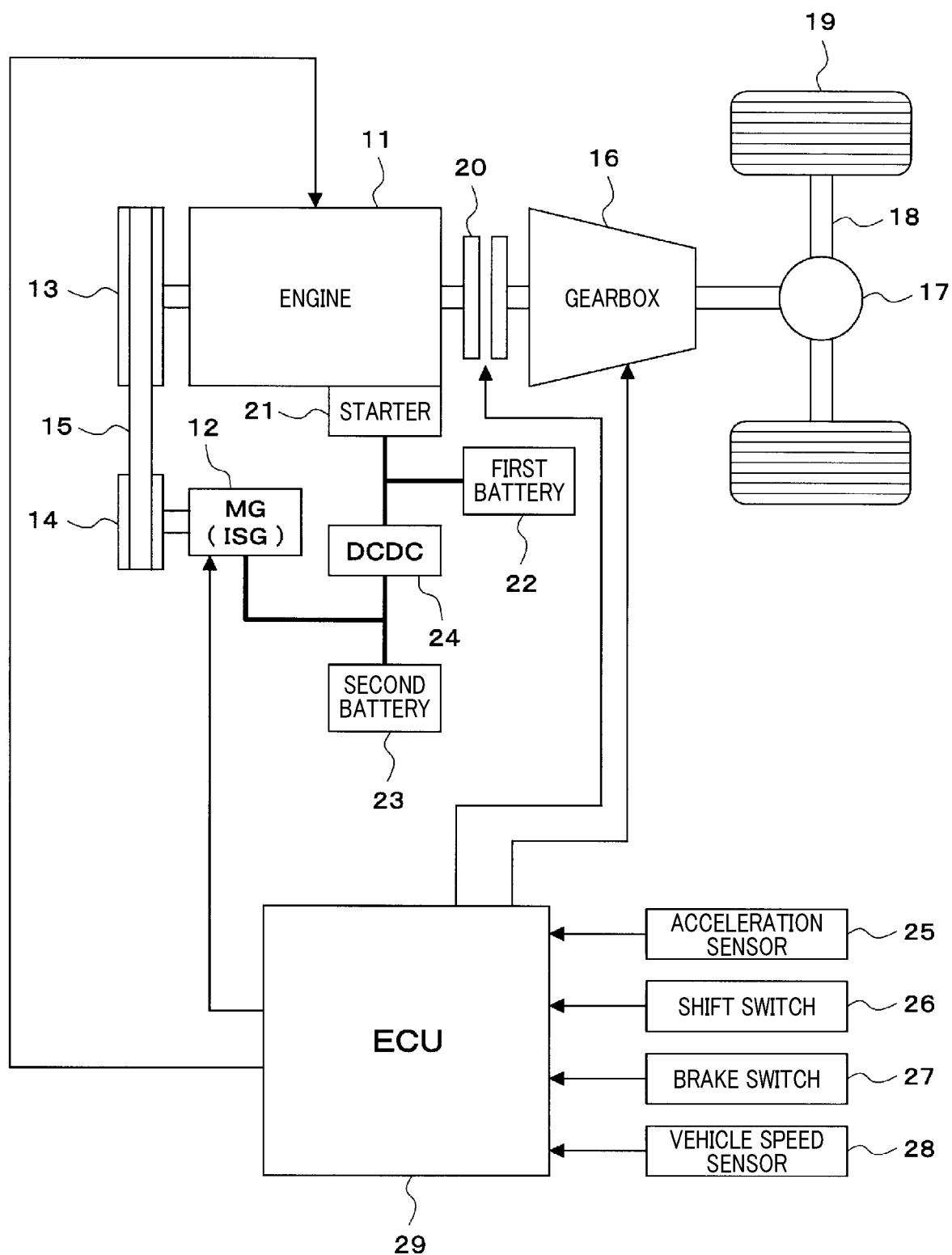
FIG. 1 is a schematic diagram illustrating a control system of the hybrid vehicle according to an embodiment of the present disclosure.

First, referring to FIG. 1, a schematic configuration of a control system for a hybrid vehicle is described.

As shown in FIG. 1, a control system 1 according to the present embodiment has an engine 11 that is an internal combustion engine, and a motor generator (hereinafter is referred to as MG) 12 as power sources for the vehicle. The MG 12 is a motor generator that also serves as a starter for cranking the engine 11 (ISG: integrated starter generator). The engine 11 has a crank shaft connected to a pulley 13. The MG 12 has a rotation shaft connected to a pulley 14. The pulley 13 and the pulley 14 are connected to each other to transmit power through a belt 15. In this case, the pulley 13, the pulley 14, the belt 15 and the like correspond to the motive power transmission mechanism. The motive power transmission mechanism which connects the engine 11 and the MG 12 to each other to transmit power may be composed of, for example, a gear mechanism.

Power from an output shaft (crank shaft) of the engine 11 is transmitted to a gearbox 16. Power from an output shaft of the gearbox 16 is transmitted to wheels 19 through a differential gear 17, an axle shaft 18 and the like. The gearbox 16 may be a multistage transmission in which a plurality of shift gears are switched stepwise, or may be a continuously variable transmission (CVT) which can change continuously. A clutch 20 for interrupting the power transmission is placed between the engine 11 and the gearbox 16. The clutch may be incorporated into the gearbox 16.

The control system 1 according to the present embodiment includes a starter 21, a first battery 22, a second battery 23 and a DCDC converter 24. The starter 21 cranks the engine 11 separately from the MG 12. The first battery 22 supplies electric power to the starter 21. The first battery 22 is configured by a secondary battery, such as a lead storage battery. The second battery 23 supplies electric power to or receives electric power from the MG 12. The second battery 23 is configured by a secondary battery, such as a lithium ion battery. The DCDC converter 24 is connected between the first battery 22 and the second battery 23.

The control system 1 according to the present embodiment includes an acceleration sensor 25, a shift switch 26, a brake switch 27, a vehicle speed sensor 28, and an ECU 29. The acceleration sensor 25 detects an accelerator opening (operation amount of an accelerator pedal). The shift switch 26 detects an operating position of a shift lever. The brake switch 27 detects a brake operation (operation amount of a brake pedal). The vehicle speed sensor 28 detects a speed of the vehicle.

The outputs from the sensors or the switches are inputted into the ECU 29 that is an electronic control unit. Based on the operating condition of the vehicle, the ECU 29 controls the engine 11, the MG 12, the gearbox 16, the clutch 20, and the like. The ECU 29 corresponds to the control apparatus (control apparatus as an aspect of the technique of the present disclosure) of the present embodiment. The engine 11, the MG 12, the gearbox 16, the clutch 20, and the like may be so configured as to be controlled by a plurality of ECUs.

Figure 2:
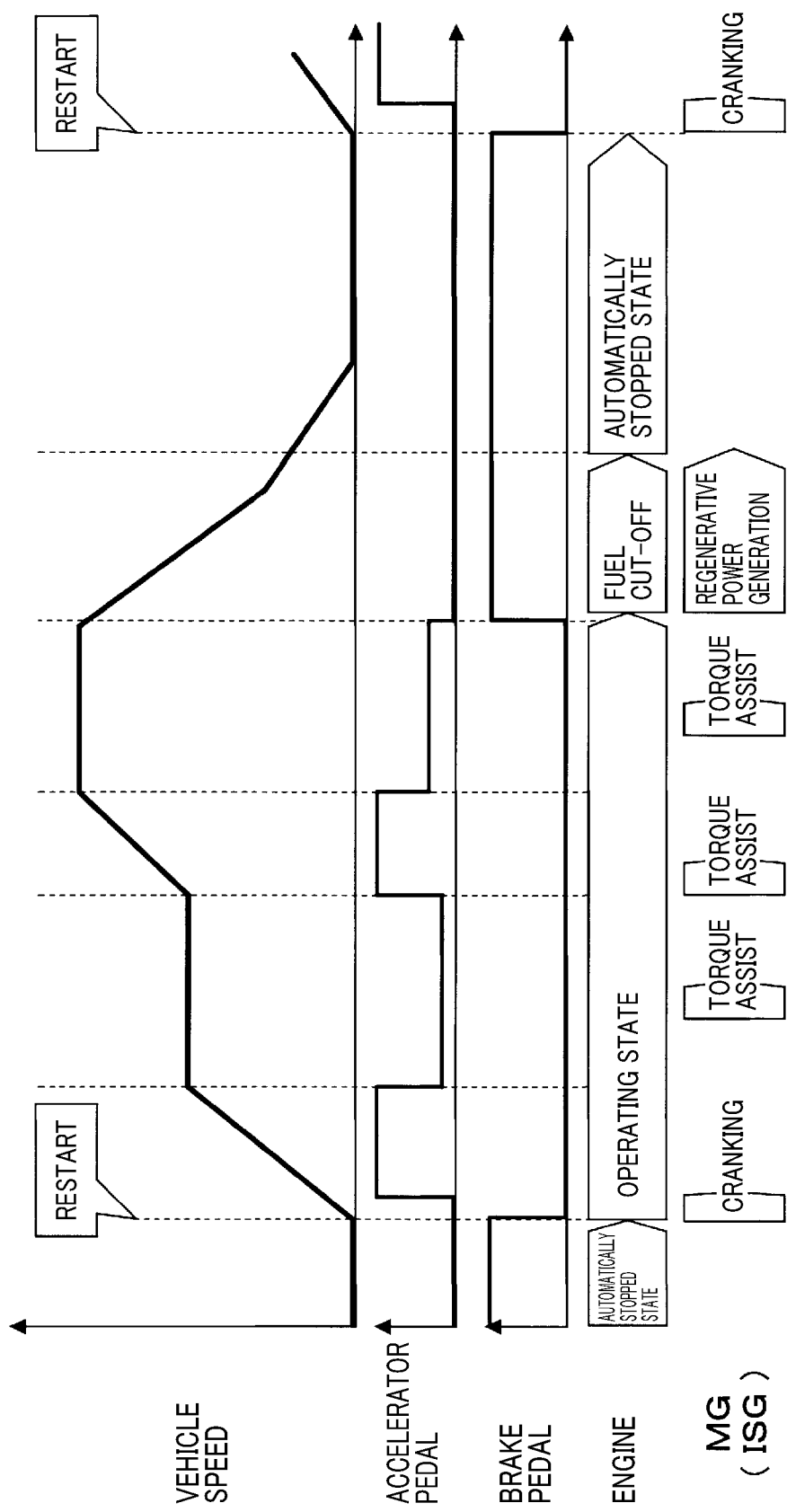
FIG. 2 is a timing diagram illustrating an example of how torque assist is conducted.

As shown in FIG. 2, when a restart is requested during automatic stop (during idling stop), the ECU 29 cranks the engine 11 using the power of the MG 12 and restarts the engine 11. When torque assist is requested while the vehicle runs (during running with the power of the engine 11), the ECU 29 causes the MG 12 to provide torque assist for the vehicle to perform motor assist running with the power of both the engine 11 and the MG 12. In a fuel cut-off state of the engine 11 (for example during deceleration of the vehicle), the ECU 29 performs regenerative power generation at the MG 12. The generated electric power is then charged to the second battery 23 (hereinafter is simply referred to as battery 23). In regenerative power generation, the ECU 29 causes the power of the engine 11, which is driven by the power of the wheels 19, to drive the MG 12, thereby causing the MG 12 to convert kinetic energy of the vehicle into electric energy.

Figure 3:
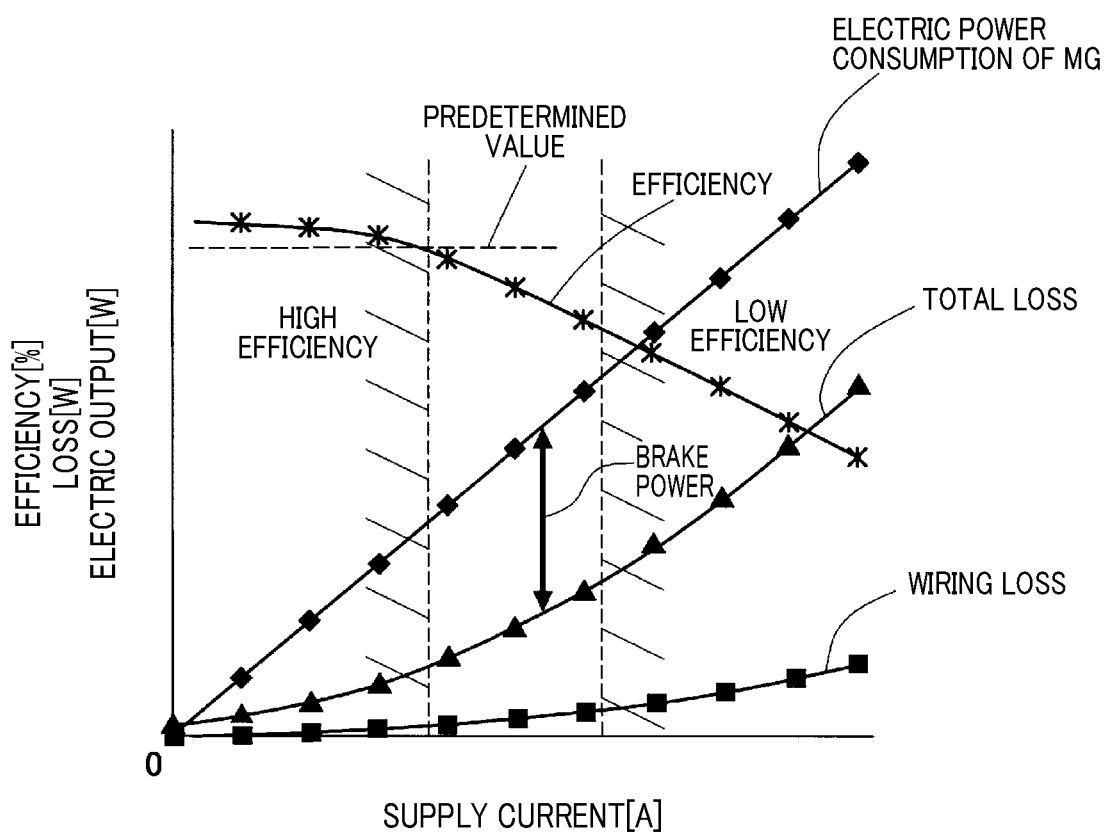
FIG. 3 is a characteristic diagram illustrating a relationship between the output of the motor generator and the efficiency thereof.

However, as shown in FIG. 3, in general, the larger the electric power consumption of the MG 12 is, the larger the electric power losses tend to be in the individual components. The electric power losses include, for example, a loss due to internal resistance of the battery 23, a loss caused in the wiring between the battery 23 and the MG 12, and a loss caused inside the MG 12. Thus, in the vehicle performing torque assist in a high output range where the output of the MG 12 is relatively larger, the total loss of the electric power is increased, and the efficiency of the MG 12 (ratio of the shaft power to the electric power consumption) is decreased. Therefore, the effect of high fuel efficiency is not achieved.

Figure 4:
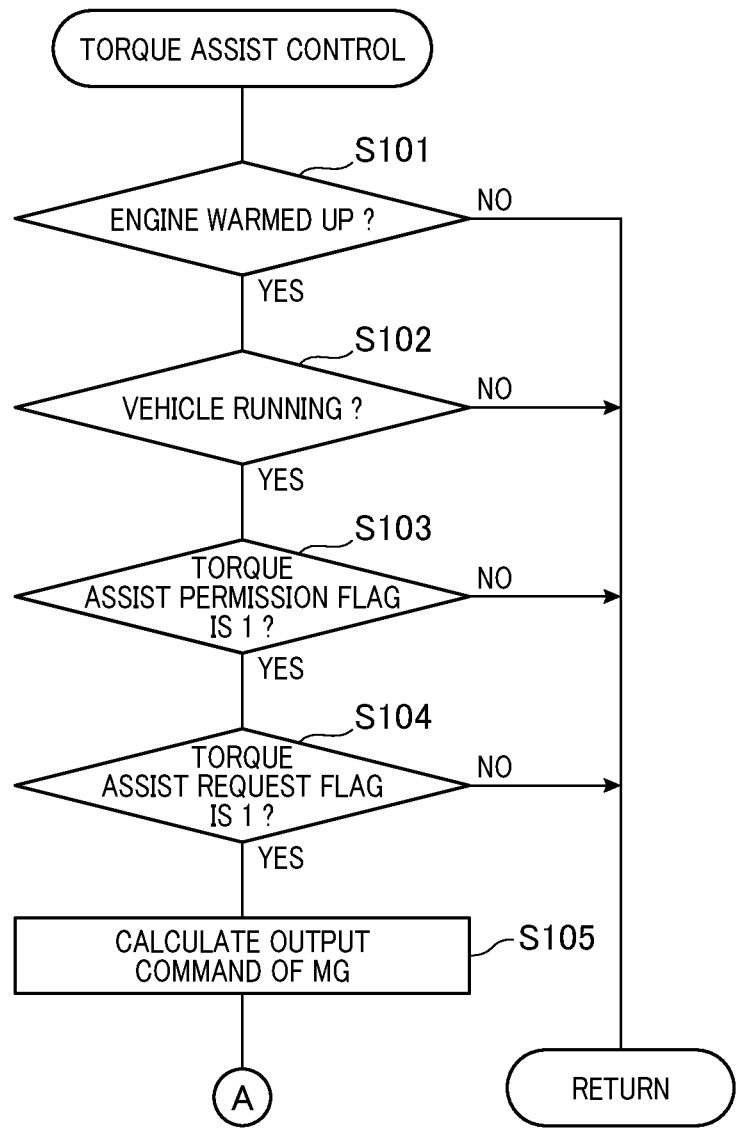
FIG. 4 is a flowchart (1/2) illustrating a routine of torque assist control.
Figure 5:
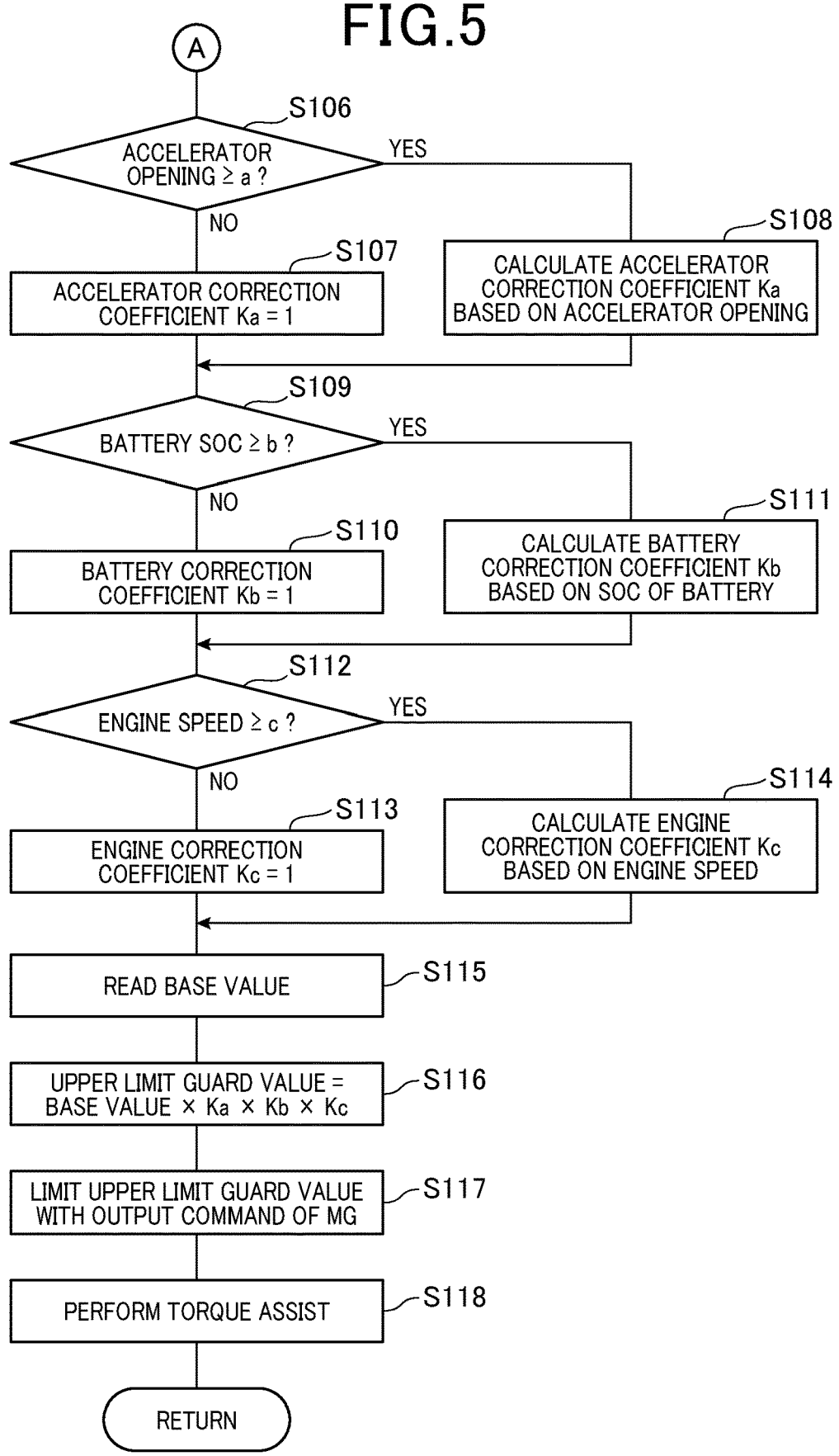
FIG. 5 is a flowchart (2/2) illustrating a routine of torque assist control.

Thus, in the control system 1 according to the present embodiment, the ECU 29 executes a routine of torque assist control as shown in FIGS. 4 and 5 to conduct the following control. The ECU 29 sets an upper limit guard value to a base value when the MG 12 provides torque assist to thereby limit the output command for the MG 12. The base value is set such that the efficiency of the MG 12 (ratio of the shaft power to the electric power consumption) is not less than a predetermined value. The ECU 29 then limits the output command for the MG 12 using the set upper limit guard value to limit the output of the MG 12. This enables the control system 1 of the present embodiment to provide torque assist in a high efficiency range where the efficiency of the MG 12 is not less than the predetermined value. Thus, the effect of fuel efficiency is increased.

Furthermore, the ECU 29 corrects an upper limit guard value to a higher value (higher output value) than the base value to achieve higher output, based on a state of driver's vehicle operation (for example, accelerator opening or change rate thereof), an SOC (state of charge) indicating the state of charge of the battery 23, and an operating condition of the engine 11 (for example, engine speed or load of the engine). The SOC of the battery 23 is defined such as by the following equation:

$$SOC = \text{residual capacity/full charge capacity} \times 100$$

More specifically, if the accelerator opening or the change rate thereof is not less than a predetermined value a, the ECU 29 corrects the upper limit guard value. The correction is made such that a larger accelerator opening or a larger change rate thereof causes the upper limit guard value to be larger than the base value to accomplish higher output. If the SOC of the battery 23 is not less than a predetermined value b, the ECU 29 corrects the upper limit guard value. The correction is made such that the larger SOC of the battery 23 causes the upper limit guard value to be larger than the base value to accomplish higher output. If an engine speed is not less than a predetermined value c, the ECU 29 corrects an upper limit guard value. The correction is made such that a larger engine speed causes the upper limit guard value to be larger than the base value to accomplish higher output.

Referring to FIGS. 4 and 5, the following describes the routine of torque assist control that the ECU 29 of the control system 1 of the present embodiment executes.

The ECU 29 executes the routine of torque assist control shown in FIGS. 4 and 5 at a predetermined cycle (for example, cyclically performed) while the power source of the ECU 29 is in an on state. As shown in FIG. 4, when the present routine is started, the ECU 29 first determines whether the engine 11 has been warmed up (step S101). The ECU 29 determines whether the engine 11 has been warmed up, based on, for example, whether the temperature of cooling water is not less than a predetermined value. If the ECU 29 determines that the engine 11 has not been warmed up (is in a state before being warmed up) (No at step S101), processing of S102 onward is not executed, thereby terminating the present routine.

If the ECU 29 determines that the engine 11 has been warmed up (Yes at step S101), the ECU 29 then determines whether the vehicle is running (step S102). If the ECU 29 determines that the vehicle is not running (in a stationary state) (No at step S102), processing of S103 onward is not executed, thereby terminating the present routine.

If the ECU 29 determines that the vehicle is running (Yes at step S102), the ECU 29 then determines whether a torque assist permission flag is 1 (step S103). The torque assist permission flag is a control value indicating whether torque assist with the MG 12 can be performed.

The ECU 29 sets the torque assist permission flag to 1 if predetermined conditions are satisfied. The conditions include the MG 12 being normal, and the SOC of the battery 23 being not less than a lower limit. Thus, if the torque assist permission flag is 1, torque assist can be performed with the MG 12.

If the ECU 29 determines that the torque assist permission flag is 0 (No at step S103), processing of S104 onward is not executed, thereby terminating the present routine.

If the ECU 29 determines the torque assist permission flag is 1 (Yes at step S103), the ECU 29 then determines whether a torque assist request flag is 1 (step S104). The torque assist request flag is a control value indicating whether torque assist with the MG 12 has been requested. The ECU 29 sets the torque assist request flag to 1 if predetermined conditions are satisfied. The predetermined conditions include an accelerator opening being not less than a predetermined value, and the SOC of the battery 23 being not less than the predetermined value. Accordingly, if the torque assist request flag is 1, torque assist using the MG 12 has been requested. If the ECU 29 determines the torque assist request flag is 0 (No at step S104), processing of S105 onward is not executed, thereby terminating the present routine.

If the ECU 29 determines that the torque assist request flag is 1 (Yes at step S104), the ECU 29 then calculates an output command for the MG 12 to perform torque assist (step S105). In this case, the ECU 29 calculates an output command for the MG 12 based on at least a piece of information among, for example, the accelerator opening, the operating condition of the engine 11, the speed of the vehicle, and the operating position of the shift lever.

Then, as shown in FIG. 5, the ECU 29 determines whether the accelerator opening is not less than a predetermined value a (for example, value of the accelerator opening from which a driver's acceleration request to the vehicle is determined to be relatively strong) (step S106). If the ECU 29 determines the accelerator opening is less than the predetermined value a (No at step S106), the ECU 29 then sets an accelerator correction coefficient Ka for correcting an upper limit guard value, to 1 (step S107). This means that if the accelerator opening is less than the predetermined value a, the upper limit guard value is not corrected based on the accelerator opening.

Figure 6:
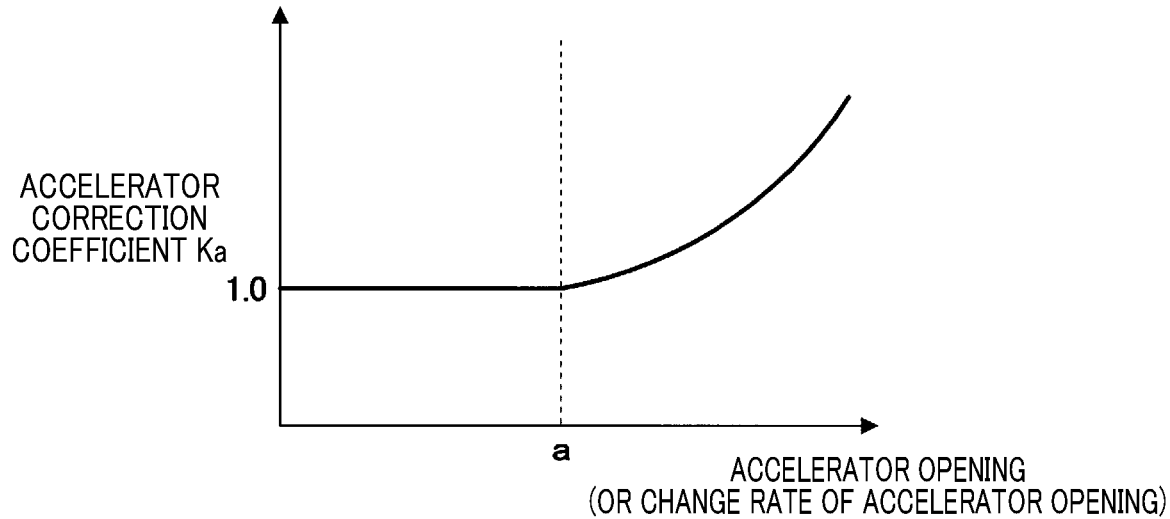
FIG. 6 is a conceptual diagram illustrating an example of a map for acceleration compensation coefficient Ka.

If the ECU 29 determines that the accelerator opening is not less than the predetermined value a (Yes at step S106), the ECU calculates the accelerator correction coefficient Ka, based on the accelerator opening (step S108). In this case, the ECU 29 calculates the accelerator correction coefficient Ka, based on a predetermined map, or a formula or the like. FIG. 6 shows that, in a range where the accelerator opening is not less than the predetermined value a, the map, or the formula or the like for the accelerator correction coefficient Ka is determined such that the accelerator coefficient Ka is more than 1, and that, the larger accelerator opening causes the accelerator correction coefficient Ka to be larger accordingly. The map herein refers to data that specifies the accelerator correction coefficient Ka, based on the accelerator opening. In the map, the value of the accelerator opening and the accelerator correction coefficient Ka are correlated with each other. The data is stored beforehand in a storage device (predetermined storage area) such as a ROM provided to the ECU 29. The ECU 29 refers to such a map to calculate the accelerator correction coefficient Ka, based on an accelerator opening, similarly to the calculation using the formula.

At steps S106 to S108, the accelerator correction coefficient Ka is ensured to be determined based on the accelerator opening, but is not limited thereto. Alternatively, the accelerator correction coefficient Ka may be determined, for example, based on a change rate (increase rate) of an accelerator opening. In this case, the ECU 29 determines whether the change rate of the accelerator opening is not less than a predetermined value a (for example, value of the change rate of the accelerator opening from which a driver's acceleration request to the vehicle is determined to be relatively strong). If the change rate of the accelerator opening is determined to be less than the predetermined value a, the accelerator correction coefficient is set to 1. If the change rate of the accelerator opening is determined to be not less than the predetermined value a, the accelerator correction coefficient Ka is calculated based on a predetermined map, or a formula or the like. In a range where the change rate of the accelerator opening is not less than the predetermined value a, the map, or the formula or the like for the accelerator correction coefficient Ka is determined such that the accelerator coefficient Ka is more than 1, and that the larger change rate of the accelerator opening causes the accelerator correction coefficient Ka to be larger accordingly.

The ECU 29 then determines whether the SOC of the battery 23 is not less than a predetermined value b (for example, a value relatively near an upper limit value of the SOC) (step S109). If the ECU 29 determines that the SOC of the battery 23 is lower than the predetermined value b (No at step S109), the ECU 29 then sets a battery correction coefficient Kb for correcting an upper limit guard value to 1 (step S110). This means that if the SOC of the battery 23 is lower than the predetermined value b, the upper limit guard value is not corrected based on the SOC of the battery 23.

Figure 7:
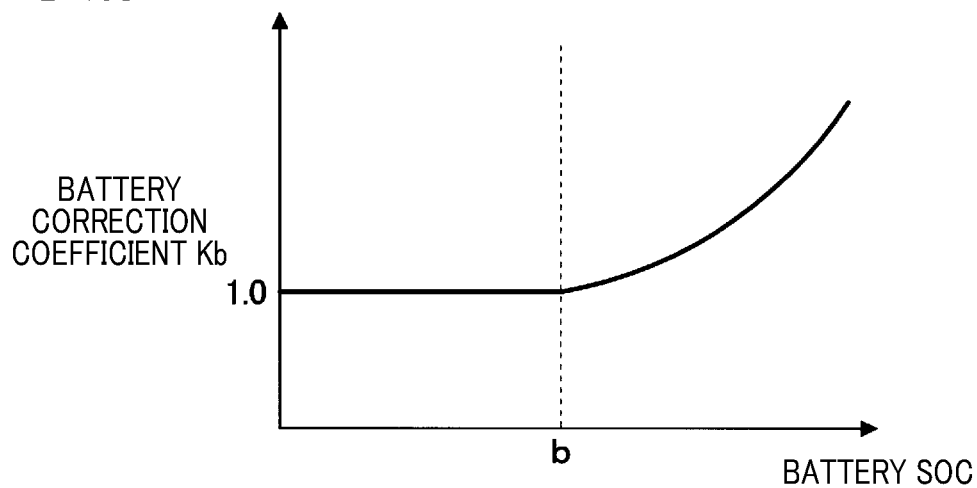
FIG. 7 is a conceptual diagram illustrating an example of a map for battery compensation coefficient Kb.

If the ECU 29 determines that the SOC of the battery 23 is not less than the predetermined value b (Yes at step S109), the ECU 29 calculates the battery correction coefficient Kb, based on the SOC of the battery 23 (step S111). In this case, the ECU 29 calculates the battery correction coefficient Kb, based on a predetermined map, or a formula or the like. FIG. 7 shows that in a range where the SOC of the battery 23 is not less than the predetermined value b, the map, or the formula or the like for the battery correction coefficient Kb is determined such that the battery correction coefficient Kb is more than 1, and that the larger SOC of the battery 23 causes the battery correction coefficient Kb to be larger accordingly. The map herein refers to data that specifies the battery correction coefficient Kb, based on the SOC. In the map, the value of the SOC of the battery 23 and the battery correction coefficient Kb are correlated with each other. The ECU 29 refers to such a map to calculate the battery correction coefficient Kb, based on the SOC, similarly to the calculation using the formula.

The ECU 29 then determines whether the engine speed is not less than a predetermined value c (for example, value of the engine speed from which an output requested from the vehicle is determined to be relatively larger) (step S112). If the ECU 29 determines that the engine speed is lower than the predetermined value c (No at step S112), the ECU 29 then sets an engine correction coefficient Kc for correcting an upper limit guard value to 1 (step S113). This means that if the engine speed is lower than the predetermined value c, the upper limit guard value is not corrected based on the engine speed.

Figure 8:
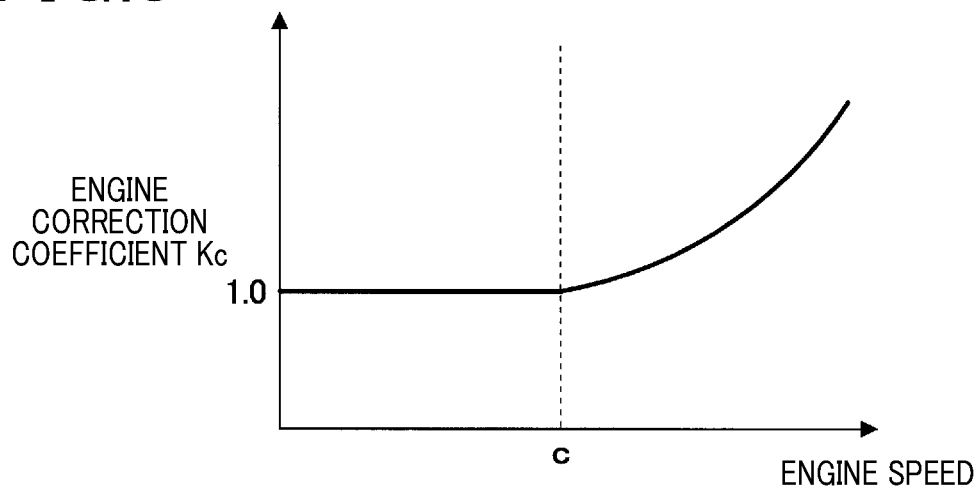
FIG. 8 is a conceptual diagram illustrating an example of a map for engine compensation coefficient Kc.

If the ECU 29 determines that the engine speed is not less than the predetermined value c (Yes at step S112), the ECU calculates the engine correction coefficient Kc, based on the engine speed (step S114). In this case, the ECU 29 calculates the engine correction coefficient Kc, based on a predetermined map, or a formula or the like. FIG. 8 shows that, in a range where the engine speed is not less than the predetermined value c, the map, or the formula or the like for the engine correction coefficient Kc is determined such that the engine correction coefficient Kc is more than 1, and that the larger engine speed causes the engine correction coefficient Kc to be larger accordingly. The map herein refers to data that specifies the engine correction coefficient Kc, based on the engine speed. In the map, the value of the engine speed and the engine correction coefficient Kc are correlated with each other. The ECU 29 refers to such a map to calculate the engine correction coefficient Kc, based on the engine speed, similarly to the calculation using the formula.

The ECU 29 then reads the base value of the upper limit guard value (step S115). The base value is determined such that the efficiency of the MG 12 (ratio of the shaft power to the electric power consumption) is not less than a predetermined value (for example, value in a range of 0.6 to 0.7). The base value is determined beforehand, based on, for example, design data or test data, and stored in a storage device (predetermined storage area) such as a ROM provided to the ECU 29. The base value may be a fixed value predetermined beforehand, or may be changed based on change factors (for example, chronological or environmental changes of a system).

The ECU 29 then calculates the upper limit guard value through the following formula by using the base value read at step S115, and the correction coefficients Ka, Kb and Kc determined at steps S106 to S114 (step S116).

Upper limit guard value=base value×Ka×Kb×Kc

If the correction coefficients Ka, Kb and Kc are all set to 1 at steps S106 to S114, the ECU 29 sets the upper limit guard value to the base value.

If the accelerator opening or the change rate thereof is not less than a predetermined value a, and the accelerator correction coefficient Ka is more than 1 (Ka>1), the ECU 29 corrects the upper limit guard value. The correction is made such that a larger accelerator opening or a larger change rate thereof causes the upper limit guard value to be larger than the base value to accomplish higher output.

If the SOC of the battery 23 is not less than a predetermined value b and the battery correction coefficient Kb is more than 1 (Kb>1), the ECU 29 corrects the upper limit guard value. The correction is made such that the larger SOC of the battery 23 causes the upper limit guard value to be larger than the base value to accomplish higher output.

If the engine speed is not less than a predetermined value c and the engine correction coefficient Kc is more than 1 (Kc>1), the ECU 29 corrects the upper limit guard value. The correction is made such that a higher engine speed causes the upper limit guard value to be larger than the base value to accomplish higher output.

Steps S106 to S116 correspond to the setting unit and perform a role as a functional part. Steps S106 to S114 is ensured to calculate correction coefficients Ka, Kb and Kc, but the calculation method is not limited thereto. The correction coefficient K may be calculated, for example, through a predetermined three dimensional map, or a formula or the like, based on the accelerator opening (or the change rate thereof), the SOC of the battery 23, or the engine speed. In this case, the ECU 29 may calculate the upper limit guard value through the following formula by using the correction coefficient K and a base value.

Upper limit guard value=Base value×K

The ECU 29 then limits the output command for the MG 12 calculated at step S105 by using the upper limit guard value (step S117). More specifically, if the output command for the MG 12 is lower than the upper limit guard value, the ECU 29 uses the output command for the MG 12 as it is. If the output command for the MG 12 is larger than the upper limit guard value, the ECU 29 sets the output command for the MG 12 to the upper limit guard value. The step S117 corresponds to the limiting unit and performs a role as a functional part.

The ECU 29 then rotates the MG 12 with supply current based on the output command for the MG 12 to provide torque assist using the MG 12 (step S118).

In the present embodiment described above, there may be a case where the correction coefficients Ka, Kb and Kc are all set to 1 when the ECU 29 (control apparatus) provides torque assist. In this case, the ECU 29 sets the upper limit guard value of the output command for the MG 12 to the base value that makes the efficiency of the MG 12 (ratio of the shaft power to the electric power consumption) be not less than a predetermined value. The ECU 29 is ensured to limit the output command for the MG 12 using the set upper limit guard value to limit the output for the MG 12. This enables the ECU 29 to provide torque assist in a high efficiency range where the efficiency of the MG 12 is not less than the predetermined value. Thus, the effect of the fuel efficiency is enhanced. Consequently, the present embodiment achieves the effect of high fuel efficiency in the range of normal acceleration (for example, during low speed running in an urban area).

The control system 1 has the MG 12 (ISG) serving as a starter, which is connected to the crank shaft of the engine 11 through the motive power transmission mechanism, such as the belt 15. Such a control system 1 has the following characteristics. The electric power generated by the MG 12 or the capacity of the battery 23 is relatively small, and the power generation of the MG 12 (charging of the battery 23) is mainly regenerative power generation performed during deceleration. Thus, in the control system 1, how efficiently the battery 23 uses the electric power is an important point. That is, in the control system 1, how efficiently the battery 23 uses the electric power that has been given by regenerative power generation is an important point. In contrast, the present embodiment allows the ECU 29 to limit the output command for the MG 12 by using the upper limit guard value to prevent undue high output torque assist, whereby the electric power of the battery 23 is used efficiently. Accordingly, systems including the ISG efficiently increase fuel efficiency.

Furthermore, the present embodiment limits the output of the MG 12 to reduce the amount of heat generated therefrom. This allows the control system 1 to prevent the MG 12 from being overheated if the cooling performance thereof is lowered. This allows the control system 1 to change the cooling method of the MG 12 from a water cooling type to an air cooling type. Advantageously, therefore, piping and the like for cooling water of the MG 12 is omitted, and cost and space can be reduced.

The present embodiment is ensured to correct an upper limit guard value to a higher value (higher output value) than the base value to achieve higher output, based on a state of driver's vehicle operation (for example, of accelerator opening or change rate thereof). Thus, the present embodiment enables change of the upper limit guard value based on the state of driver's vehicle operation. Specifically, the present embodiment enables change of the upper limit guard value from the one achieving the effect of improving fuel efficiency to the one achieving driver's request.

More specifically, if the accelerator opening or the change rate thereof is not less than a predetermined value a, the ECU 29 is ensured to correct the upper limit guard value. The correction is made such that the larger accelerator opening or the larger change rate thereof causes the upper limit guard value to be larger to accomplish higher output. In other words, the present embodiment is so configured that the larger the accelerator opening or the change rate thereof is, the stronger the driver's acceleration request (higher acceleration request) is determined to be, and thus the upper limit guard value is corrected to a higher value to achieve higher output. Accordingly, the ECU 29 corrects the upper limit guard value such that a higher driver-requested acceleration causes the upper limit guard value to be larger to accomplish higher output, and thus the output (amount of torque assist) of the MG 12 can be made larger. In this way, the control system 1 exhibits acceleration performance based on the driver's acceleration request, and thus secure drivability.

The correction of the upper limit guard value is not limited to what has been described above. Other correction methods may, for example, be employed to use a driver-selected running mode (for example, economy mode or sport mode) as a state of driver's vehicle operation so that the upper limit guard value may be ensured to be corrected based on the running mode.

Furthermore, in the present embodiment, there may be a case where the SOC of the battery 23 is not less than a predetermined value b. In this case, the upper limit guard value is ensured to be corrected such that a higher SOC of the battery 23 results in higher value (higher output value) than the base value to achieve higher output. Accordingly, the ECU 29 corrects the upper limit guard value such that a higher SOC of the battery 23 causes the upper limit guard value to be larger to accomplish higher output, and thus the output (amount of torque assist) of the MG 12 can be made larger. In this way, the present embodiment moderately increases the discharge amount of the battery 23 and moderately decreases the state of charge of the battery 23. As a result, the control system 1 secures sufficient amount of electric power that can charge the battery 23 at the time of next deceleration through regenerative power generation, and thus can efficiently use kinetic energy of the vehicle during deceleration.

In the present embodiment, the ECU 29 is ensured to correct the upper limit guard value, based on the state of driver's vehicle operation, the SOC of the battery 23 and the operating condition of the engine 11, but the correction method is not limited thereto. Alternatively, for example, the upper limit guard value may be corrected based on only the state of driver's vehicle operation. Alternatively, The ECU 29 may be ensured to correct the upper limit guard value, based on the SOC of the battery 23 or the operating condition of the engine 11. Alternatively, the ECU 29 may be ensured to correct the upper limit guard value, based on two pieces of information among the state of driver's vehicle operation, the SOC of the battery 23, or the operation condition of the engine 11. Still alternatively, the ECU 29 may be so configured that the upper limit guard value is not corrected based on the state of driver's vehicle operation, the SOC of the battery 23, or the operation condition of the engine 11 (i.e. the upper limit guard value is always set to the base value).

In the present embodiment, the ECU 29 limits the output command for the MG 12 by using the upper limit guard value to limit the output of the MG 12, but the limitation method is not limited thereto. Alternatively, for example, the ECU 29 may be ensured to limit the upper limit guard value by using other command values, such as the current command value, the torque command value and the like, of the MG 12 to limit the output thereof.

In the present embodiment, a part or all of the functions the ECU 29 executes may be accomplished by hardware, such as one or more ICs.

The techniques of the present disclosure is not limited to the configuration of the hybrid vehicle shown in FIG. 1, but can be applied for implementation to hybrid vehicles of various configurations including an engine and a MG as power sources for the vehicles. The techniques of the present disclosure may be applied to, for example, hybrid vehicles whose MG is connected to a power transmission system, in which the power of the engine is transmitted to wheels (for example, a hybrid vehicle in which the MG is arranged between the engine and the gearbox), and the ones including a plurality of MGs.

REFERENCE SIGNS LIST

11: Engine
12: MG
29: ECU (setting unit, limiting unit)

The invention claimed is:
1. A control apparatus for a hybrid vehicle having an engine and a motor generator as power sources of the vehicle, and a battery supplying or receiving electric power to or from the motor generator, the control apparatus performing torque assist using the motor generator during operation with power of the engine, the control apparatus comprising:
a setting unit that:
sets an upper limit guard value to limit a command value of the motor generator to a base value, such that a ratio of a shaft power to an electric power consumption of the battery is not less than a predetermined value, when providing the torque assist, the ratio of the shaft power to the electric power consumption of the battery being a ratio according to a total loss including (i) a first power loss caused in the motor generator, and (ii) a second power loss of at least one of (1) a power loss due to internal resistance of the battery and (2) a power loss caused in a wiring between the battery and the motor generator, and
subsequently corrects the upper limit guard value during operation of the hybrid vehicle based on whether at least one parameter selected from a group of an accelerator degree opening, a state of charge of the battery, and an engine speed is equal to or greater than a predetermined threshold; and
a limiting unit that limits an output of the motor generator by limiting a command value of the motor generator based on the upper limit guard value, when providing the torque assist, wherein the upper limit guard value is calculated based on the base value with the following formula:
upper limit guard value=base value×Ka×Kb×Kc,
wherein:
Ka is an accelerator correction coefficient calculated based on the accelerator degree opening;
Kb is a battery correction coefficient calculated based on the state of charge of the battery; and

Kc is an engine correction coefficient calculated based on the engine speed.

2. The control apparatus for a hybrid vehicle according to claim 1, wherein the setting unit corrects the upper limit guard value to be a higher value than the base value to achieve a higher output, based on at least a state of vehicle operation of a driver.

3. The control apparatus for a hybrid vehicle according to claim 2, wherein the setting unit corrects, as the state of vehicle operation, the upper limit guard value using the accelerator opening or the change rate of the accelerator opening to result in the higher output, the correction of the upper limit guard value being made such that a larger accelerator opening or a larger change rate of the accelerator opening causes the upper limit guard value to be larger than the base value.

4. The control apparatus for a hybrid vehicle according to claim 1, wherein the setting unit corrects the upper limit guard value to produce a higher output, the correction of the upper limit guard value being made such that a larger state of charge of the battery causes the upper limit guard value to be larger than the base value, the battery supplying or receiving electric power to or from the motor generator.

5. The control apparatus for a hybrid vehicle according to claim 1, wherein the motor generator serves as a starter connected to a crank shaft of the engine through a motive power transmission mechanism.

6. A control apparatus for a hybrid vehicle, the control apparatus being applied to the hybrid vehicle and including: (i) an engine and a motor generator as power sources of the vehicle, (ii) a battery supplying or receiving electric power to or from the motor generator, and (iii) a setting unit setting an upper limit guard value to limit a command value of the motor generator to a base value, when providing torque assist, such that a ratio of a shaft power to an electric power consumption of the battery is not less than a predetermined value, the ratio of the shaft power to the electric power consumption of the battery being a ratio according to a total loss including (i) a first power loss caused in the motor generator, and (ii) a second power loss of at least one of (1) a power loss due to internal resistance of the battery and (2) a power loss caused in a wiring between the battery and the motor generator, and the setting unit subsequently correcting the upper limit guard value during operation of the hybrid vehicle based on whether at least one parameter selected from a group of an accelerator degree opening, a state of charge of the battery, and an engine speed is equal to or greater than a predetermined threshold, the control apparatus providing the torque assist using the motor generator during operation with power of the engine, the control apparatus comprising:

a limiting unit limiting an output of the motor generator by limiting the command value of the motor generator based on the upper limit guard value, when providing the torque assist, wherein the upper limit guard value is calculated based on the base value with the following formula:

upper limit guard value=base value×Ka×Kb×Kc,
wherein:
Ka is an accelerator correction coefficient calculated based on the accelerator degree opening;
Kb is a battery correction coefficient calculated based on the state of charge of the battery; and
Kc is an engine correction coefficient calculated based on the engine speed.

7. A control apparatus for a hybrid vehicle, the control apparatus being applied to the hybrid vehicle and including: (i) an engine and a motor generator as power sources of the vehicle, (ii) a battery supplying or receiving electric power to or from the motor generator, and (iii) a limiting unit limiting an output of the motor generator by limiting a command value of the motor generator based on an upper limit guard value, when providing torque assist, the control apparatus providing the torque assist using the motor generator during operation with power of the engine, the control apparatus comprising:

a setting unit that:
sets the upper limit guard value to limit the command value of the motor generator to a base value, when providing the torque assist, such that a ratio of a shaft power to an electric power consumption of the battery is not less than a predetermined value, the ratio of the shaft power to the electric power consumption of the battery being a ratio according to a total loss including (i) a first power loss caused in the motor generator, and (ii) a second power loss of at least one of (1) a power loss due to internal resistance of the battery and (2) a power loss caused in a wiring between the battery and the motor generator, and
subsequently corrects the upper limit guard value during operation of the hybrid vehicle based on whether at least one parameter selected from a group of an accelerator degree opening, a state of charge of the battery, and an engine speed is equal to or greater than a predetermined threshold, wherein the upper limit guard value is calculated based on the base value with the following formula:

upper limit guard value=base value×Ka×Kb×Kc,
wherein:
Ka is an accelerator correction coefficient calculated based on the accelerator degree opening;
Kb is a battery correction coefficient calculated based on the state of charge of the battery; and
Kc is an engine correction coefficient calculated based on the engine speed.

8. A control method for a hybrid vehicle, the method being executed by a control apparatus for the hybrid vehicle, the control apparatus including an engine and a motor generator as power sources of the vehicle, and a battery supplying or receiving electric power to or from the motor generator, the control apparatus providing torque assist using the motor generator during operation with power of the engine, the method comprising steps of:

setting an upper limit guard value when providing the torque assist, the upper limit guard value limiting a command value of the motor generator to a base value such that a ratio of a shaft power to an electric power consumption of the battery is not less than a predetermined value, the ratio of the shaft power to the electric power consumption of the battery being a ratio according to a total loss including (i) a first power loss caused in the motor generator, and (ii) a second power loss of at least one of (1) a power loss due to internal resistance of the battery and (2) a power loss caused in a wiring between the battery and the motor generator;

subsequently correcting the upper limit guard value during operation of the hybrid vehicle based on whether at least one parameter selected from a group of an accelerator degree opening, a state of charge of the battery, and an engine speed is equal to or greater than a predetermined threshold; and limiting an output of the motor generator, when providing the torque assist, by limiting the command value of the motor generator using the upper limit guard value, wherein the upper limit guard value is calculated based on the base value with the following formula:

upper limit guard value=base value×Ka×Kb×Kc, wherein:
        Ka is an accelerator correction coefficient calculated based on the accelerator degree opening;
        Kb is a battery correction coefficient calculated based on the state of charge of the battery; and
        Kc is an engine correction coefficient calculated based on the engine speed.

* * * * *